A. DONASON.
Road-Grader.
No. 207,594. Patented Sept. 3, 1878
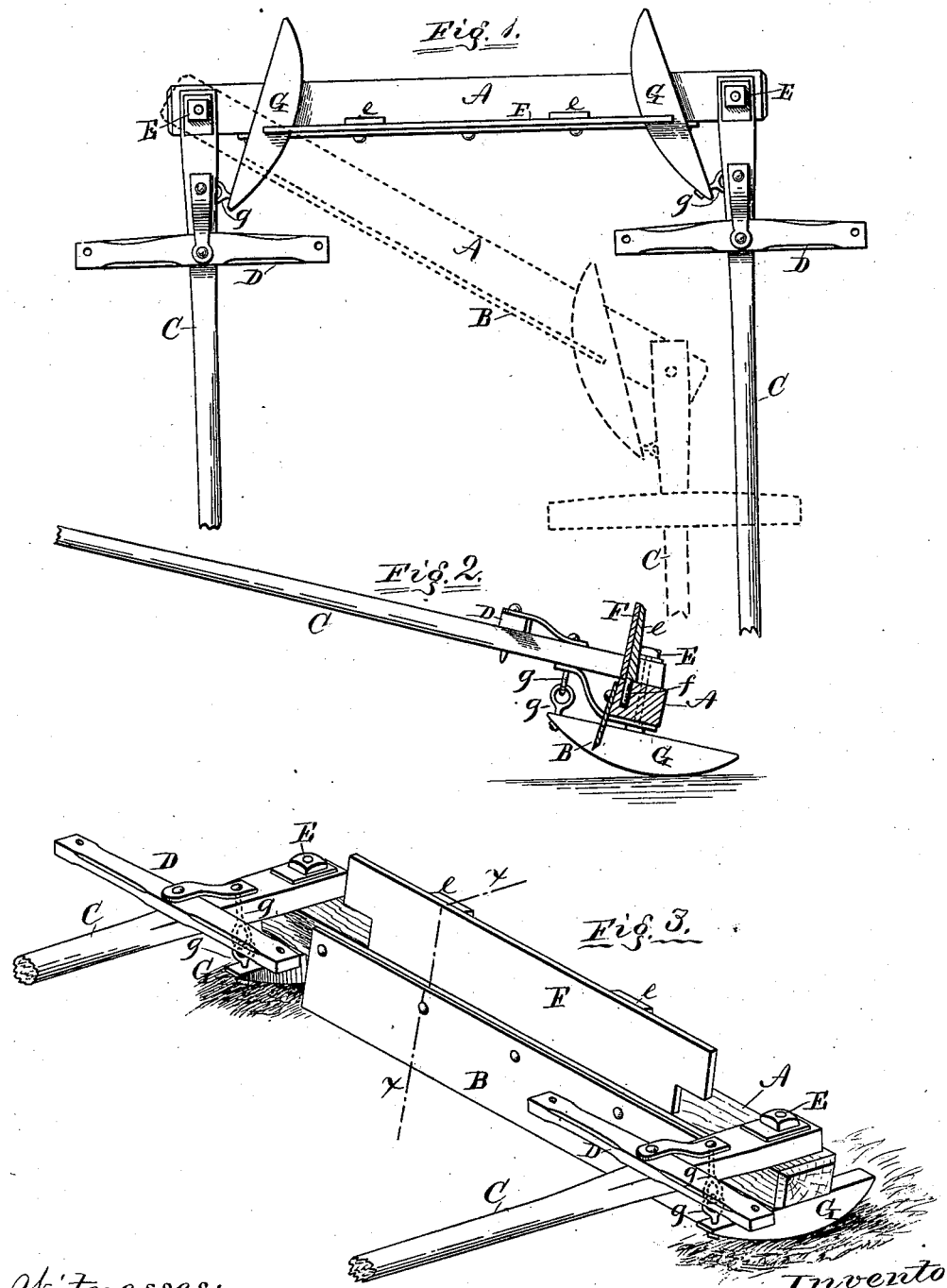

UNITED STATES PATENT OFFICE.

ALEXANDER DONASON, OF MAQUON, ILLINOIS.

IMPROVEMENT IN ROAD-GRADERS.

Specification forming part of Letters Patent No. 207,594, dated September 3, 1878; application filed July 5, 1878.

*To all whom it may concern:*

Be it known that I, ALEXANDER DONASON, of Maquon, in the county of Knox and State of Illinois, have invented certain new and useful Improvements in Road-Graders; and I do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1 is a top-plan view of a machine embodying my invention. Fig. 2 is a sectional view in the line $x\ x$ in Fig. 3. Fig. 3 is a perspective view.

This invention relates to improvements in machines for scraping and leveling rough roads; and consists, first, in the use of a scraper-head, to which the side-draft poles are hinged or pivoted in such manner that either pole may be driven in advance of the other, to throw the scraper obliquely to the line of progression, for the purpose of rendering its cut more effective and to force the loose dirt over to one side; second, in the use of runners, attached by links to the draft-poles in such manner that they may be turned under the scraper-head to form supports for local transportation, or be turned up and rest upon the head when it is in use as a scraper; third, in the use of a removable shield above the scraper-head, all as hereinafter fully described.

Referring to the drawing by letters, A is a heavy bar, constituting the scraper-head, to the front side of which is bolted the scraper-blade B, which projects below the head A, and has its lower edge sharpened.

C C are the draft-poles, each provided with a double-tree, D, to which the draft-animals are attached. The poles C are bolted, one to each end of the head A, by pivot-bolts E, which permit either one of the poles C, with its adjacent end of the head A, to be advanced or receded in relation to the other, as shown by dotted lines at Fig. 1 of the drawings, and thus to bring the scraper B at any desired oblique angle to the line of progression of the machine, for the purposes of more effectual cutting and of pressing the dirt transversely into ruts and other desired places.

F is a shield, to the back of which are attached bars $e$, having projecting ends, which may be inserted in holes $f$ in the head A, for the purpose of fixing the shield F above the head A, when desired to prevent any dirt from being thrown back over the head.

G G are runners, attached by interlocking eyebolts $g\ g$, one to the under side of each draft-pole C, in such manner that they may be turned up and lie on the bar A, as shown at Fig. 1, when the machine is in use scraping, and may be turned down to form supporting-runners, as shown at Figs. 2 and 3, when it is desired to move the machine short distances from place to place. The runners G are preferably formed of blocks thick enough to maintain their last-named positions without other fastenings than the eyebolts described.

Having thus described my invention, what I claim as new, and desire to secure by Letters Patent, is—

1. In a road scraper or leveler, a main scraper-head, in combination with draft-poles, attached by hinge or pivot joints, one to each end of the scraper-head, substantially as described, and for the purpose specified.

2. The runners G, attached to the poles C by loose connections, and arranged to operate with the head A, scraper B, and poles C, substantially as described, and for the purpose specified.

3. The shield F, having arms $e$, and removably attached to the head A, substantially as described, and for the purpose specified.

In testimony that I claim the foregoing as my own I affix my signature in presence of two witnesses.

ALEXANDER DONASON.

Witnesses:
  M. H. BARRINGER,
  H. A. ALLEN.